United States Patent
Beeker et al.

[11] 3,930,411
[45] Jan. 6, 1976

[54] FLUID MEASURING DEVICE
[75] Inventors: Christoph Beeker, Starnberg; Wolfgang Melzer, Weilheim; Rudiger Romer, Munich; Gerhard Schieferstein, Baierbrunn, all of Germany
[73] Assignee: Linde Aktiengesellschaft, Wiesbaden, Germany
[22] Filed: Aug. 1, 1974
[21] Appl. No.: 493,838

Related U.S. Application Data
[63] Continuation of Ser. No. 341,469, May 15, 1973, abandoned.

[30] Foreign Application Priority Data
Mar. 17, 1972 Germany............................ 2213193

[52] U.S. Cl................................. 73/223; 73/304 C
[51] Int. Cl.²............................................ G01F 3/38
[58] Field of Search........... 73/223, 304 C, 113, 114

[56] References Cited
UNITED STATES PATENTS

| | | | |
|---|---|---|---|
| 2,625,933 | 1/1953 | Salisbury | 73/223 X |
| 3,000,207 | 9/1961 | Goffe | 73/113 |
| 3,216,251 | 11/1965 | Hansen | 73/223 |
| 3,423,998 | 1/1969 | Blomgren, Jr. | 73/113 |
| 3,744,314 | 7/1973 | Lenny | 73/304 C |

Primary Examiner—Charles A. Ruehl
Attorney, Agent, or Firm—Millen, Raptes & White

[57] ABSTRACT

The invention relates to a device for measuring the quantity of a flow of fluid from fluid storage means such as liquefied gas. The device comprises a capacitor partially immersed in the stored fluid which includes a chamber being partially filled with the fluid. As fluid is drained from the capacitor, the timing and variations in capacitance are measured which is used to calculate quantity of flow.

10 Claims, 2 Drawing Figures

3,930,411

FLUID MEASURING DEVICE

This is a continuation, of application Ser. No. 341,469, filed Mar. 15, 1973, now abandoned.

BACKGROUND OF THE INVENTION

This invention relates to an apparatus for measuring the quantity of a liquid or gas flow, especially a low-boiling liquid gas, through liquid outlet means of a storage tank provided with liquid inlet and outlet means.

A method for measuring the quantity of flow of a liquid is known wherein a baffle is disposed in the current flow, whereby there is a pressure drop in the flow of the liquid past the baffle and this pressure drop can be measured by conventional means. The pressure drop, along with the known throughflow rate of the baffle, can be utilized with the aid of Bernoulli's theorem and the continuity relation for calculating the fluid quantity.

A disadvantage of this method is the inaccurate measurement of smaller quantities of fluid flows. Furthermore, in measuring the quantity of fluid flow of a low-boiling liquid gas which is near its boiling point, increased evaporation losses occur due to the pressure drop in the baffle, having a disadvantageous effect on the result of the measurement.

SUMMARY OF THE INVENTION

An object of this invention is to provide a device which can accurately determine the quantity of a fluid flow independently of the physical condition of the fluid, and independently of the amount conveyed.

Another object of this invention is to provide a device which is characterized by a capacitor disposed within a storage tank, and being at least partially immersed in the liquid, an inner chamber which is filled, at least partially, with fluid and is sealed off with respect to the liquid volume. This internal chamber is in communication with a liquid discharge conduit so that it can be closed off by a drain valve, with a refilling valve communicating with the liquid volume in the tank and with a recording instrument for registering the capacitance of the capacitor.

In a further object, the device makes it possible to measure accurately very small fluid quantities.

DETAILED DESCRIPTION OF THE INVENTION

Figure 1:
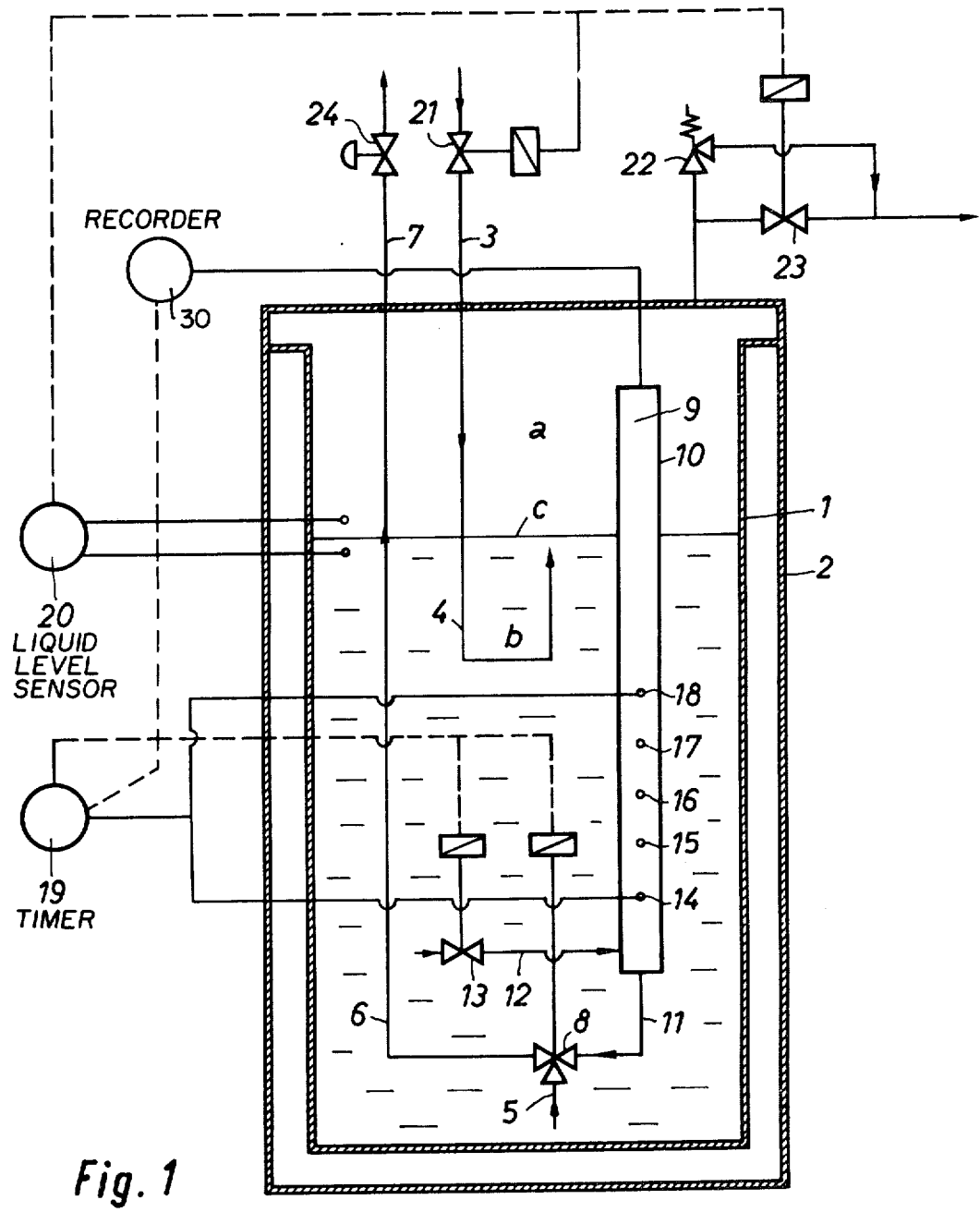

The basic principle of the device of this invention is based on the known fact that the capacitance of a capacitor depends on the dielectric disposed between the charged plates. In the present case, the dielectric is the fluid or liquefied gas present in an annular space of the capacitor, sealed off with respect to the liquid volume in the storage tank.

During a measurement of the fluid quantity, the annular space of the capacitor is in communication, by means of a drain valve, with a liquid discharge conduit, so that the liquid flows from the annular space of the capacitor into the liquid discharge conduit. This results in a permanent change in the capacitance of the capacitor as registered by a recording instrument, since the liquid serves as the dielectric. By providing, within the annular space of the capacitor, at least two vertically superimposed switching points, the amount of fluid flowing therebetween can be readily determined. As the liquid level drops and passes the upper switching point, the recording instrument, triggered by the respectively ambient capacitance, activates a timer. This timer is turned off after a measurable time period when the liquid level passes through a second switching point disposed below the first switching point. The fluid flow rate $\Delta V : \Delta t$ can now be very accurately determined from the measured time $\Delta t$ and the known volume $\Delta V$ present between the switching points. It is clear, therefore, that very small fluid quantities can be determined by a suitable choice of the volume interval $\Delta V$.

An advantageous variation of the measuring range of the device of this invention resides in arranging several switching points at superimposed intervals varied in a defined manner one above the other, and coupling the start and/or cutoff of the timer with various switching points, by suitable switching means. In case of n switching points, with $n = 1, \ldots, s, \ldots n$, the following measuring ranges can be covered, for example:

$$\Delta V_1: \Delta t_1, \ldots, \Delta V_s: \Delta t_s, \ldots, \Delta V_n: \Delta t_n; \text{ or}$$

$$\sum_{n=1}^{n} \frac{\Delta V_n}{\Delta t_n}$$

respectively wherein $\Delta V_n$ is the volume interval between the (n-1)th and the n-th switching point, and $\Delta t_n$ is the measured time required by the liquid level for traversing this volume interval.

As soon as a measurement is terminated, the refilling valve, which was closed at the beginning of the measurement, is opened again and the drain valve is closed, so that inner chamber of the capacitor, which was emptied entirely or partially during the measurement, is again filled up to the upper level of its liquid volume. In order to make it possible to further convey the liquid continuously through the liquid discharge conduit after the measurement, another advantageous embodiment of the device of this invention resides in constructing the drain valve as a change-over valve in such a manner that by simply switching this valve over, the liquid discharge conduit can be connected either with the closed inner chamber of the capacitor or with the liquid volume directly.

The entire measuring process can be automated in a simple manner, by providing, according to another feature of the present invention, that the timer is controllably coupled with the refilling valve as well as with the change-over drain valve in such a manner that the timer, as soon as the shutoff command is applied thereto, changes the drain valve over to the liquid volume, on the one hand, and opens the refilling valve, on the other hand.

In order to obtain extremely sharp signals of the recording instrument, which are desirable for very accurate fluid quantity measurements, the invention provides, in another embodiment thereof, that disc-shaped displacement members are disposed within the inner space of the capacitor at the locations of the switching points. These displacement members are dimensioned so that merely a very narrow gap remains vacant between the displacement member and the charged surfaces of the capacitor. This affords the advantage that large changes in capacitance are reached within short time periods in the zone of the displacement members, as soon as the liquid in the inner chamber passes through such a narrow gap during a measurement. In such an arrangement, the recording device can then be coupled with a limit switch or can itself be constructed as a limit switch, so that, for starting and/or deactivating the timer, a sharp signal can be employed, indicating the capacitance variation with the time, dC : dt.

Another advantageous modification of the device of this invention resides in employing, as the capacitor, a cylindrical capacitor with an annular space between an outer jacket and a concentric core, wherein the annular space of the cylindrical capacitor corresponds to the closed-off inner chamber of the capacitor and is equipped with the corresponding parts of the apparatus and/or coupled with their mode of operation.

The present invention thus represents a simple and advantageous apparatus for measuring, during flow, a fluid quantity, and in particular, a very small fluid quantity.

In a further feature of this invention, since the refilling valve, as well as the change-over drain valve, are disposed within the liquid volume of the tank it is possible to measure the amounts of quantity of flow of a low-boiling liquid gas, such as, for example, liquefied natural gas. All parts of the apparatus are exposed to uniform and constant physical conditions, i.e., for example, constant temperatures and uniform pressure during the measurement procedures.

The present invention will be made more clear by reference to the following drawings and the accompanying description which illustrate schematically the various embodiments of the invention.

Figure 2:
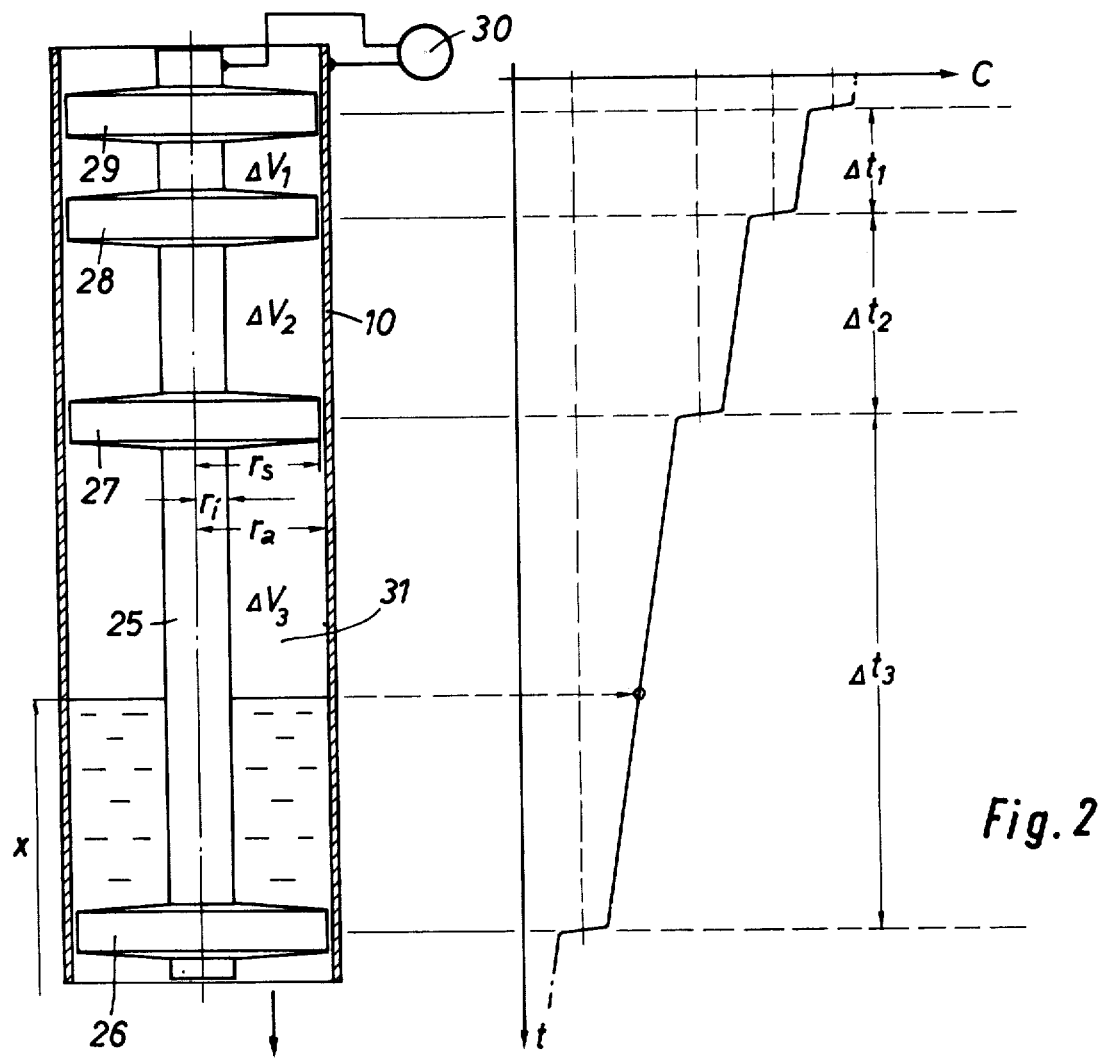

FIG. 1 is a schematic representation of an embodiment of the device of the present invention showing an enclosed tank, containing a capacitor, and FIG. 2 is a vertical cross section through a cylindrical capacitor constructed according to this invention, as well as a curve associated therewith, indicating the capacitance characteristic $C = f(X,t)$.

FIG. 1 shows a vacuum-insulated liquid-gas tank with an internal jacket 1 and an external jacket 2. Liquid gas is introduced into the tank through conduits 3 and 4 and is withdrawn, during stationary operation, through conduits 5, 6, and 7, with a change-over drain valve 8 in a correspondingly open position.

Within the liquid-gas tank, a charged cylindrical capacitor 9, having an external shell 10 shown in detail in FIG. 2, is vertically disposed partially in the liquid volume $b$ and partially in the vapor space $a$ of the tank. The level of the liquid volume is denoted by $c$. The cylindrical capacitor has an annular space 31 between the outer jacket 10 and the inner concentric core 25. This space 31 is in communication, through conduit 11 and the change-over drain valve 8, with liquid discharge conduit 6. Space 31 is also in communication through conduit 12 and the refilling valve 13, with liquid volume $b$ of the tank, so that it can be filled with liquid up to the level $c$. Within the annular space 31 there are a number of switching points 14, 15, 16, 17, 18 two of which i.e.,. 14 and 18, are connected to a timer 19 in this embodiment. The timer 19 is controllably coupled with the valves 13 and 8. A liquid level sensing mechanism 20 is controllably connected to a valve 21 disposed in the liquid feed conduit 3 and controls the liquid level $c$ within the storage tank at a permanently constant value. Relief valves 22 and 23 prevent the formation of an excess pressure within the liquid-gas tank.

The apparatus of this embodiment operates as follows: In the stationary operating condition, i.e. in an operating condition where no fluid quantity measurement is conducted, liquefied gas is introduced into the tank via conduits 3 and 4, is stored within the tank, and is withdrawn when needed through conduits 5, 6, and 7, as well as the correspondingly opened drain valve 8. Valve 24 roughly meters the withdrawn amount. The introduced quantity of liquefied gas is controlled by the liquid level sensor 20 such that a permanent, constant liquid level $c$ is maintained in the tank. During this operating condition, the refilling valve 13 is open so that the annular space 31 of the capacitor is filled with liquid to the level $c$.

When it is intended, from time to time, to measure the liquid quantity flow through the conduit 6, the drain valve 8 is changed over to conduit 11, and the refilling valve 13 is closed. Liquid then flows from the annular space 31 of the capacitor through conduit 11 and into conduit 6. In this operation, the liquid level between the charged surfaces of the capacitor is being lowered and as the decreasing liquid level reaches the switching point 18, the timer 19 is automatically activated and when the level passes through the switching point 14, the timer is again turned off, and at the same time, the drain valve 8 is thereby switched to conduit 5, the refilling valve 13 is again opened, thereby reestablishing the stationary operating condition. Since the volume $\Delta V$ of the annular space between the switching points 18 and 14 is known, and the time $\Delta t$ of the lowering of the liquid level from switching point 18 to point 14 is measured very accurately, the flow rate i.e. $\Delta V : \Delta t$ through conduit 6 can be exactly determined.

The general principle of measuring a fluid quantity is explained in greater detail in FIG. 2 by producing suitable initial and terminal signals for operating the timer.

FIG. 2 shows, on the left, a vertical cross section of the cylindrical capacitor employed herein, which consists of the external shell 10 and the concentric core 25. The capacitance of such a capacitor is calculated as $$C(x) = \epsilon_o \epsilon \, x / \ln \frac{r_a}{r_i}$$

wherein $\xi_o$ represents the absolute dielectric constant, $\xi$ is the relative dielectric constant, i.e. in this case that of the liquid present in the annular space, $x$ represents the respectively present vertical height of the liquid within the annular space, $r_a$ is the radius of the outer capacitor shell, and $r_i$ is the radius of the concentric core.

According to the invention, a number of annular horizontal discs, or displacement members in this example four discs, 26, 27, 28, 29 are disposed, in vertical superposition, within the annular space 31. The radius $r_s$ of these discs is somewhat smaller than that of the outer shell $r_a$, so that in the zone of the discs there remains vacant only a relatively narrow annular gap between the outer rim of the disc and the inner surface of the capacitor shell. Thus, in total, the relationship applies that $(r_a - r_s)$ is much smaller than $(r_a - r_i)$. The vertical spacing of the individual discs is varied in a defined manner, wherein, however, the respective volume $\Delta V$ between individual discs is fixedly determined.

The right-hand portion of FIG. 2 graphically illustrates the capacitance characteristic of a cylindrical capacitor, constructed as set forth above, as a function of the time and/or as a function of the lowering speed of the liquid present in the annular space of the cylindrical capacitor. In the curve, the capacitance C recorded by the recording device 30 is plotted on the abscissa and the time t is plotted on the ordinate. The course of the curve shows that, with a basically linear path, relatively large jumps in the capacitance occur at the location of the disc within short time periods. Thus, in this zone, the variation in capacitance with the time is very large. However, according to this invention, these large jumps or step functions in capacitance are utilized for the production of suitable electric signals for starting and/or deactivating the timer 19, for example by providing that the recording device 30 is a limit switch or is coupled with such a switch.

Thus, when emptying the annular space of the cylindrical capacitor, which was initially completely filled with liquid, during a fluid quantity measurement, the limit switch registers, for example, for the first time a large variation in capacitance when the liquid level enters the gap of the disc 29, and now turns on the timer. Upon the subsequent strong variation, as registered, for example, when the liquid level enters into the gap of the disc 28, the limit switch turns the timer off again. From the time $\Delta t_1$ and the flow volume $\Delta V_1$, the fluid quantity $\Delta V_1 : \Delta t_1$ can now be readily determined. By suitable switching variations, it is, of course, also possible to determine other fluid quantities, for example $\Delta V_2 : \Delta t_2$, $\Delta V_3 : \Delta t_3$ or $(\Delta V_1 + \Delta V_2) : (\Delta t_1 + \Delta t_2)$, $(\Delta V_1 + \Delta V_2 + \Delta V_3) : (\Delta t_1 + \Delta t_2 + \Delta t_3)$ and $(\Delta V_2 + \Delta V_3) : (\Delta t_2 + \Delta t_3)$. The measuring range to be presently employed depends basically on the amount of liquid conveyed and on the required accuracy of the measurement.

Basically, the device of the present invention makes it possible to determine very accurately the amounts of also very small throughflow quantities of a continuous flow through a pipe or some other conveying system. Moreover, it is also possible to determine very accurately discrete quantities of liquid in accordance with the device of this invention.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for measuring the quantity of flow of a low-boiling fluid from fluid storage means, said storage means comprising a stored fluid, fluid discharge conduit means, and fluid inlet conduit means; a capacitor at least partially immersed within said stored fluid and comprising an inner chamber at least partially filled with said fluid, drain valve means communicating with said chamber and said discharge conduit means, refilling valve means communicating with said chamber and said stored fluid, and recording means for registering the capacitance of said capacitor.

2. The apparatus of claim 1 wherein said drain valve means is two stage communicating with either said chamber or said stored fluid.

3. The apparatus of claim 1 wherein said recording means is coupled with timer means which controls both said drain and refilling valve means.

4. The apparatus of claim 3 wherein said recording means is adapted to record the variation of the capacitance with respect to time.

5. The apparatus of claim 4, wherein said variation of capacitance is a step function and wherein said timer is activated and deactivated by said variation in capacitance.

6. The apparatus of claim 1 wherein at least two horizontally disposed, disc-shaped displacement members are superimposed vertically in said fluid in said chamber, and wherein a narrow gap is present between the outer rim of said displacement members and surfaces of the outer walls of said capacitor.

7. The apparatus of claim 1 wherein said capacitor is cylindrical having an inner concentric core, and said chamber is an annular space between the outer capacitor shell and said inner concentric core.

8. The apparatus of claim 1 wherein said refilling valve means and said drain valve means are disposed in said stored fluid of said storage means.

9. The apparatus of claim 1 comprising sensing means for maintaining the level of said fluid in said storage means and said capacitor.

10. The apparatus of claim 1, wherein said low-boiling fluid is a liquified gas.

* * * * *